US010706285B2

(12) United States Patent
Deng (10) Patent No.: US 10,706,285 B2
(45) Date of Patent: Jul. 7, 2020

(54) AUTOMATIC SHIP TRACKING METHOD AND SYSTEM BASED ON DEEP LEARNING NETWORK AND MEAN SHIFT

(71) Applicant: ZHUHAI DA HENGQIN TECHNOLOGY DEVELOPMENT CO., LTD., Zhuhai (CN)

(72) Inventor: Lianbing Deng, Zhuhai (CN)

(73) Assignee: ZHUHAI DA HENGQIN TECHNOLOGY DEVELOPMENT CO., LTD., Zhuhai (CN)

( * ) Notice: Subject to any disclaimer, the term of this patent is extended or adjusted under 35 U.S.C. 154(b) by 0 days.

(21) Appl. No.: 16/627,485

(22) PCT Filed: Dec. 11, 2018

(86) PCT No.: PCT/CN2018/120294
§ 371 (c)(1),
(2) Date: Dec. 30, 2019

(87) PCT Pub. No.: WO2019/101220
PCT Pub. Date: May 31, 2019

(65) Prior Publication Data
US 2020/0160061 A1   May 21, 2020

(30) Foreign Application Priority Data
Dec. 11, 2017   (CN) .......................... 2017 1 1324260

(51) Int. Cl.
*G06K 9/00* (2006.01)
*G06N 3/08* (2006.01)
(Continued)

(52) U.S. Cl.
CPC ..... *G06K 9/00718* (2013.01); *G06K 9/00771* (2013.01); *G06K 9/6212* (2013.01);
(Continued)

(58) Field of Classification Search
None
See application file for complete search history.

(56) References Cited

U.S. PATENT DOCUMENTS 8,224,029 B2 *   7/2012  Saptharishi ........ G06K 9/00771
                                                   382/103
8,615,105 B1 *  12/2013  Cheng ................ G06K 9/00771
                                                   382/103
(Continued)

FOREIGN PATENT DOCUMENTS

CN          102081801 A         6/2011
CN          104182772 A        12/2014
(Continued)

OTHER PUBLICATIONS

Lan Long, et al., Studies on visual object tracking algorithms, National Defense Science&Technology, Oct. 2017, pp. 12-18, vol. 38, No. 5.

*Primary Examiner* — Shervin K Nakhjavan
(74) *Attorney, Agent, or Firm* — Bayramoglu Law Office LLC (57) ABSTRACT

An automatic ship tracking method and system based on deep learning network and mean shift, wherein the method includes: collecting surveillance video data which includes collecting coastal region surveillance video data under visible light and extracting each frame of image; performing preprocessing to extract a positive sample and a negative sample of a ship target; inputting the samples of the ship target in the video into a neural network to train a model by a region-based convolutional neural network method; extracting initial frame data of the video and performing ship detection and probability density calculation on initial moment data according to the trained model; and determin-
(Continued)

ing a ship tracking result at the current moment by a calculation result of a previous moment.

4 Claims, 6 Drawing Sheets

(51) Int. Cl.
  *G06T 7/277* (2017.01)
  *G06T 7/11* (2017.01)
  *G06K 9/62* (2006.01)
(52) U.S. Cl.
  CPC ............... *G06N 3/08* (2013.01); *G06T 7/11* (2017.01); *G06T 7/277* (2017.01); *G06T 2207/30232* (2013.01); *G06T 2207/30241* (2013.01)

(56) References Cited

U.S. PATENT DOCUMENTS

| | | | | |
|---|---|---|---|---|
| 9,832,452 | B1* | 11/2017 | Fotland | H04N 13/20 |
| 2008/0063285 | A1* | 3/2008 | Porikli | G06K 9/4642 |
| | | | | 382/190 |
| 2010/0067741 | A1* | 3/2010 | Stolkin | G06T 7/277 |
| | | | | 382/103 |
| 2010/0246997 | A1* | 9/2010 | Porikli | G06T 7/251 |
| | | | | 382/291 |
| 2012/0070034 | A1 | 3/2012 | Xiao et al. | |
| 2012/0288152 | A1* | 11/2012 | Yano | G06T 7/248 |
| | | | | 382/103 |
| 2013/0215264 | A1* | 8/2013 | Soatto | G06T 7/207 |
| | | | | 348/143 |
| 2017/0270674 | A1* | 9/2017 | Shrivastava | G06T 11/60 |

FOREIGN PATENT DOCUMENTS

| | | |
|---|---|---|
| CN | 104809917 A | 7/2015 |
| CN | 105184271 A | 12/2015 |
| CN | 106372590 A | 2/2017 |
| CN | 106910204 A | 6/2017 |
| CN | 107291232 A | 10/2017 |
| CN | 107358176 A | 11/2017 |
| CN | 107818571 A | 3/2018 |

* cited by examiner

AUTOMATIC SHIP TRACKING METHOD AND SYSTEM BASED ON DEEP LEARNING NETWORK AND MEAN SHIFT

CROSS REFERENCE TO THE RELATED APPLICATIONS

This application is the national phase entry of International Application No. PCT/CN2018/120294, filed on Dec. 11, 2018, which is based upon and claims priority to Chinese Patent Application No. 201711324260.4, filed on Dec. 11, 2017, the entire contents of which are incorporated herein by reference.

TECHNICAL FIELD

The disclosure belongs to the field of digital image processing technologies, and more particularly, to an automatic ship tracking method based on deep learning network and mean shift.

BACKGROUND

In modern society, video surveillance cameras can be found everywhere. It is easy to miss abnormal events in videos if we only rely on human eyes to observe and detect. With the rapid development of computer networks, communication and semiconductor technologies, more and more people prefer to use computer vision instead of human eyes to analyze video images obtained by sensors and acquire useful information in the images. Video tracking is one of the focuses of computer vision studies, which mainly tracks objects of interest obtained by image sensors. Video tracking is the basis of multiple video applications, such as traffic monitoring, smart robots and human-computer interaction, which plays an important role in smart city management, cracking down on illegal and criminal activities and building safe and smart cities, and is the focus and difficulty of video processing studies at present.

Studies on video tracking systems have been always focused on single-target tracking, which tracks the only object of interest in monitoring. The single-target tracking is of great significance to handling of abnormal events. However, a multi-target tracking method can provide a lot of help to regulatory authorities in multiple aspects, such as early warning prompt, surveillance and management before the abnormal events occur.

At present, the multi-target tracking mainly includes a prediction-based method, a matching-based method and a detection-based method.

The prediction-based method regards a tracking problem as a state estimation problem, which optimally estimates a state (e.g., position, color, shape, etc.) of the target in next frame by signal processing according to given data. The method mainly includes a tracking algorithm based on filtering and an algorithm based on subspace learning. Filtering-based algorithms such as Kalman filtering, mean shift filtering and particle filtering mainly learn a feature space of the target according to previous data, and then locate the target according to distribution of image blocks of a current frame in the feature space. The prediction method has the advantage of fast speed in multi-target tracking, but the state of the current frame completely depends on a tracking result of the previous frame, so the target tracking cannot be automatically performed, and tracking error situations are difficult to correct.

The matching-based algorithm regards the multi-target tracking problem as a template matching problem, which uses a template to represent a target to be tracked to find an optimal matching result in next frame. The target may be one or a group of image blocks, or global or local feature representation of a target image. Such method improves tracking performances by the process of learning while tracking, but is still difficult to achieve automatic multi-target tracking results, and is also difficult to accurately track in covered and complex environments.

The detection-based algorithm regards the tracking problem as a target detection problem, which separates a target from a background, uses obtained data for training to obtain a classifier, and automatically performs target detection on the current frame, wherein an image block with the highest score is considered as a target position. The detection-based algorithm includes an offline method and an online method. The former uses pre-training or initial data of one or more frames to learn the classifier, while the latter uses sampled data of the current frame to carry out new training on the classifier. The offline learning method has poor tracking effect on dynamically changing targets, while the online learning method is easy to cause error accumulation due to the introduction of new errors in each update, and eventually drift or even lose targets. It still needs further studies on how to automatically and quickly track multiple targets accurately, i.e., considering results of the current frame and referring to different features of the target.

SUMMARY

The disclosure is intended to provide an automatic ship tracking method based on deep learning network and mean shift to overcome the shortcomings and deficiencies of the prior art.

A technical solution of the disclosure relates to an automatic ship tracking method based on deep learning network and mean shift, including the following steps:

step 1: collecting surveillance video data which includes collecting coastal region surveillance video data under visible light and extracting each frame of image;

step 2: performing preprocessing based on a video image obtained in the step 1 to extract a positive sample and a negative sample of a ship target;

step 3: inputting the samples of the ship target in the video into a neural network to train a model by a region-based convolutional neural network method;

step 4: extracting initial frame data of the video and performing ship detection and probability density calculation on initial moment data according to the trained model obtained in the step 3, step 5: determining a ship tracking result at the current moment through a calculation result of a previous moment, which includes the following processing:

step A: taking $\xi$ ship positions tracked at a moment t−1 as initial positions, respectively taking a center coordinate $f_0$ of each ship position as an initial target position of the ship tracked at a moment t, taking the $f_0$ as a center of a search window to obtain a center position coordinate f of a corresponding candidate ship, calculating a region histogram of a candidate position, and further calculating the probability density;

step B: describing a degree of similarity between the ship model and the candidate ship by a Bhattacharyya coefficient, calculating a mean shift iteration equation in a center of the region, so that the model moves continuously towards a direction with a maximum color change until the last two moving distances are less than a corresponding preset threshold, finding a ship position obtained by a mean shift result at the moment t, setting that multiple ship positions $Boxm^t$ are obtained, and expressing an $id^{th}$ ship position as $Boxm_{id}^t$;

Step C: By region-based convolutional neural network method, performing a ship detection on the image at time t, and obtaining the $num^{th}$ detection coordinate $Boxd_{num}^t$ of multiple ships in the image at time t, calculating a degree of overlap between the $Boxd_{num}^t$ and the $id^{th}$ ship position $Boxm_{id}^t$, recording a value of degree of overlap $O_{max}$ between each $Boxm_{id}^t$ and the corresponding $Boxd_{num}^t$ with a maximum degree of overlap;

step D: updating a new ship target appeared at the moment t by a neural network detection result of the step C, which includes calculating a maximum value of the degrees of overlap obtained respectively between each $Boxd_{num}^t$ and all the $Boxm_{id}^t$, if the $O_{max}'$ is less than a corresponding threshold $\theta_2$, considering the ship target as the ship appeared at the moment t, and adding the ship target into a tracking result of the moment t to obtain a complete tracking result set.

Moreover, a degree of overlap between each $Boxd_{num}^t$ and the $id^{th}$ $Boxm_{id}^t$ is calculated, and a calculation formula of the degree of overlap is as follows:

$$O = \frac{S(Boxm_{id}^t \cap Boxd_{num}^t)}{S(Boxm_{id}^t \cup Boxd_{num}^t)}$$

wherein, S represents an area size.

Moreover, the probability density calculation in the step 4 is realized by dividing a gray color space of a target region to obtain a gray histogram formed by multiple equal intervals, and calculating the probability density according to a histogram interval to which a gray value of a pixel in the target region belongs.

The disclosure further provides an automatic ship tracking system based on deep learning network and mean shift, including the following modules:

a first module configured to collect surveillance video data which includes collecting coastal region surveillance video data under visible light and extracting each frame of image;

a second module configured to perform preprocessing based on a video image obtained by the first module to extract a positive sample and a negative sample of a ship target;

a third module configured to input the samples of the ship target in the video into a neural network to train a model by a region-based convolutional neural network method;

a fourth module configured to extract initial frame data of the video and perform ship detection and probability density calculation on initial moment data according to the trained model obtained by the third module; and a fifth module configured to determine a ship tracking result at the current moment through a calculation result of a previous moment, which includes the following ways:

taking $\xi$ ship positions tracked at a moment t−1 as initial positions, respectively taking a center coordinate $f_0$ of each ship position as an initial target position of the ship tracked at a moment t, taking the $f_0$ as a center of a search window to obtain a center position coordinate f of a corresponding candidate ship, calculating a region histogram of a candidate position, and further calculating the probability density; describing a degree of similarity between the ship model and the candidate ship by a Bhattacharyya coefficient, calculating a mean shift iteration equation in a center of the region, so that the model moves continuously towards a direction with a largest color change until the last two moving distances are less than a corresponding preset threshold, finding a ship position obtained by a mean shift result at the moment t, setting that multiple ship positions $Boxm^t$ are obtained, and expressing an $id^{th}$ ship position as $Boxm_{id}^t$;

By region-based convolutional neural network method, performing a ship detection on the image at time t, and obtaining the $num^{th}$ detection coordinate $Boxd_{num}^t$ of multiple ships in the image at time t, calculating a degree of overlap between the $Boxd_{num}^t$ and the $id^{th}$ ship position $Boxm_{id}^t$, recording a value of degree of overlap $O_{max}$ between each $Boxm_{id}^t$ and the corresponding $Boxd_{num}^t$ with a maximum degree of overlap; and updating a new ship target appeared at the moment t by a neural network detection result of the step C, which includes calculating a maximum value of the degrees of overlap obtained respectively between each $Boxd_{num}^t$ and all the $Boxm_{id}^t$, if the $O_{max}'$ is less than a corresponding threshold $\theta_2$, considering the ship target as the ship appeared at the moment t, and adding the ship target into a tracking result of the moment t to obtain a complete tracking result set.

Moreover, a degree of overlap between each $Boxd_{num}^t$ and the $id^{th}$ is calculated, and a calculation formula of the degree of overlap is as follows:

$$O = \frac{S(Boxm_{id}^t \cap Boxd_{num}^t)}{S(Boxm_{id}^t \cup Boxd_{num}^t)}$$

wherein, S represents an area size.

Moreover, the probability density calculation in the step fourth module is realized by dividing a gray color space of a target region to obtain a gray histogram formed by multiple equal intervals, and calculating the probability density according to a histogram interval to which a gray value of a pixel in the target region belongs.

The present invention further discloses an electronic device, comprising:

a memory having instructions stored thereon;

a processor configured to execute the instructions to perform operations for automatic ship tracking based on deep learning network and mean shift, the operations comprising:

step 1: collecting surveillance video data which comprises collecting coastal region surveillance video data under visible light and extracting each frame of image;

step 2: performing preprocessing based on a video image obtained in the step 1 to extract a positive sample and a negative sample of a ship target;

step 3: inputting the samples of the ship target in the video into a neural network to train a model by a region-based convolutional neural network method;

step 4: extracting initial frame data of the video and perform ship detection and probability density calculation on initial moment data according to the trained model obtained in the step 3, wherein the probability density calculation is realized by dividing a gray color space of a target region to obtain a gray histogram formed by multiple equal intervals, and calculating the probability density according to a histogram interval to which a gray value of a pixel in the target region belongs; and step 5: determining a ship tracking result at the current moment by a calculation result of a previous moment, which comprises the following ways:

step A: taking $\xi$ ship positions tracked at a moment t−1 as initial positions, respectively taking a center coordinate $f_0$ of each ship position as an initial target position of the ship tracked at a moment t, taking the $f_0$ as a center of a search window to obtain a center position coordinate f of a corresponding candidate ship, calculating a region histogram of a candidate position, and further calculating the probability density;

step B: describing a degree of similarity between the ship model and the candidate ship by a Bhattacharyya coefficient, calculating a mean shift iteration equation in a center of the region, so that the model moves continuously towards a direction with a maximum color change until the last two moving distances are less than a corresponding preset threshold, finding a ship position obtained by a mean shift result at the moment t, setting that multiple ship positions $Boxm^t$ are obtained, and expressing an $id^{th}$ ship position as $Boxm_{id}^t$;

step C: performing a ship detection on an image at the moment t by the region-based convolutional neural network method, setting that a $num^{th}$ detection coordinate of multiple ships in the image at the moment t is $Boxd_{num}^t$, by region-based convolutional neural network method, performing a ship detection on the image at time t, and obtaining the $num^{th}$ detection coordinate $Boxd_{num}^t$ of multiple ships in the image at time t, calculating a degree of overlap between the $Boxd_{num}^t$ and the $id^{th}$ ship position $Boxm_{id}^t$, recording a value of degree of overlap $O_{max}$ between each xiug $Boxm_{id}^t$ and the corresponding $Boxd_{num}^t$ with a maximum degree of overlap; and step D: updating a new ship target appeared at the moment t by a neural network detection result of the step C, which comprises calculating a maximum value of the degrees of overlap obtained respectively between each $Boxd_{num}^t$ and all the $Boxm_{id}^t$ if the $O_{max}^t$ is less than a corresponding threshold $\theta_2$, considering the ship target as the ship appeared at the moment t, and adding the ship target into a tracking result of the moment t to obtain a complete tracking result set.

Compared with the prior art, the disclosure has the following advantages and effective results.

In the depth learning method part, the region-based convolutional neural network is specifically adopted to perform the simultaneous detection process on multiple ship targets on the surveillance video image. The method is fast, efficient and high in accuracy. The method still has good detection results for complex scenes such as cloudy, foggy and overcast days and the like, and has high robustness.

A fast and efficient mean shift tracking method based on color histogram is adopted to simultaneously predict the mean shift results of the current frame for multiple targets tracked in the previous frame to obtain multiple prediction positions. The histogram of the target is not affected by a shape change of the target, so the mode of using the histogram as the target to match according to the color distribution has good stability.

On one hand, the combination of the deep learning network method and the mean shift tracking method can better complete the automatic tracking process of multiple ship targets, so that the tracking process is fully automated and does not need a man-machine interaction process; on the other hand, the stability and accuracy of the neural network method also eliminate the errors of the mean shift tracking method, and lay a foundation for tracking an emerging target, thus having important market values.

DETAILED DESCRIPTION OF THE EMBODIMENTS

In order to better understand the technical solutions of the disclosure, the disclosure will be further described in detail below with reference to the drawings and embodiments.

Figure 1:
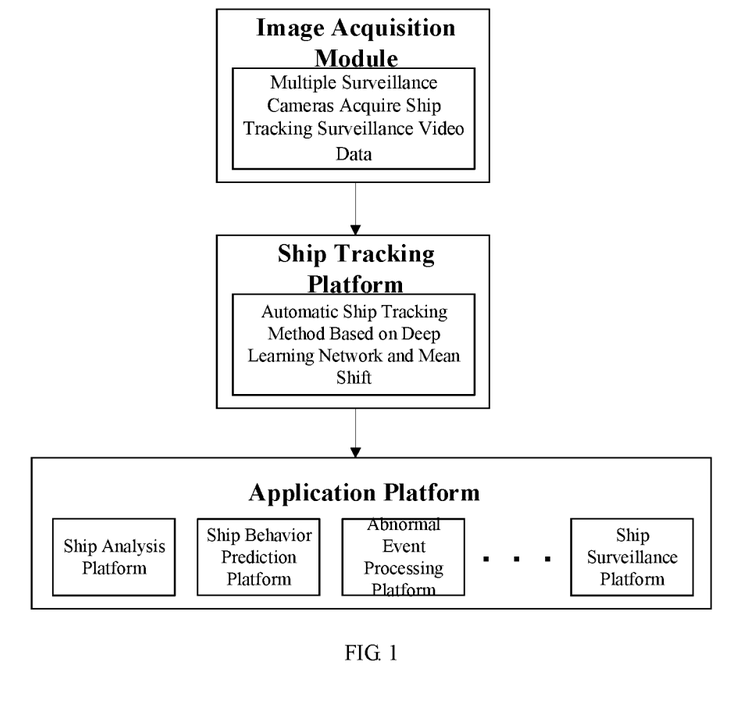
FIG. 1 is a structural diagram of an application platform system according to an embodiment of the disclosure.

Referring to FIG. 1, when the disclosure is applied, an applicable system architecture mainly includes a surveillance video acquisition module, a ship tracking platform and an application platform. The surveillance video acquisition module mainly uses multiple visible light surveillance cameras to acquire seaside region videos, and transmits data to the ship tracking module. The ship tracking platform employs the method of the disclosure to extract and automatically track ship targets, and transmits abnormal situations of ship targets and the like to the application platform. According to a specific ship analysis platform, a behavior prediction platform, an abnormal event processing platform and a ship surveillance platform in the application platform, the distribution and action of the ship targets are analyzed, and reasonable prediction and planning are made so as to complete relevant tasks.

Figure 2:
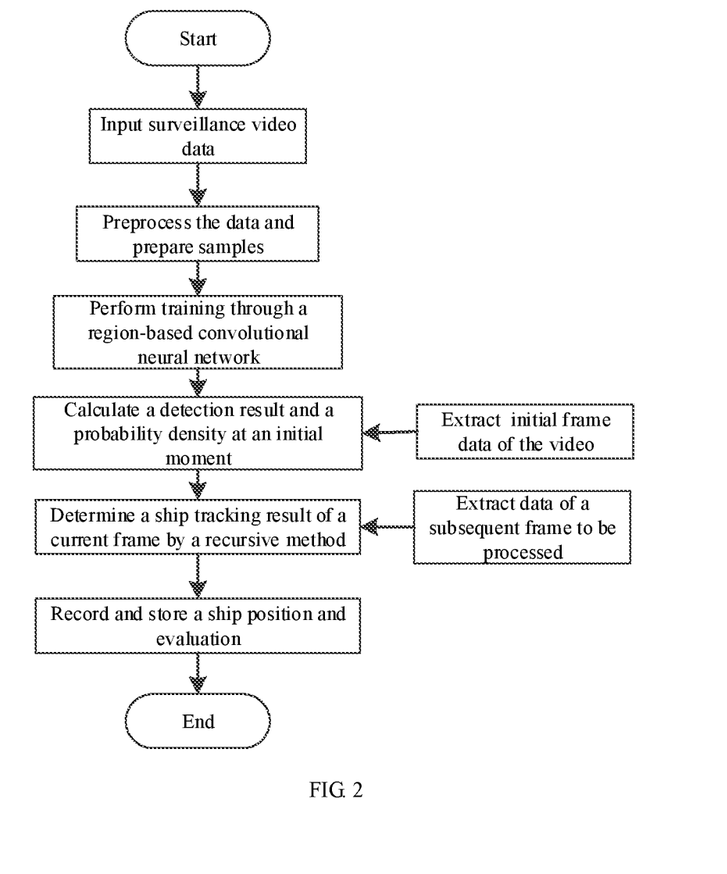
FIG. 2 is an overall flow chart of an embodiment of the disclosure.

Referring to FIG. 2, the method provided by the embodiments of the disclosure includes the following steps.

In step 1, surveillance video data is inputted: Surveillance video data may be collected in advance.

Collection of surveillance video data: the data needing to be collected by the disclosure is mainly coastal region surveillance video data under visible light. For the collected video data, it is necessary to obtain each frame of image through a decoder or a code. In specific implementation, the data may be collected in advance.

In step 2, the data is preprocessed and samples are prepared: preprocessing of the video data and preparation of positive and negative samples of a ship target.

The acquired surveillance video data needs to be preprocessed to facilitate development of subsequent digital image algorithms. An image smoothing operation is mainly employed in the preprocessing part, and a median filtering method is adopted in the disclosure to smooth each frame of video image. The positive and negative samples are prepared for convolutional neural network training in subsequent steps, a specific process of which is as follows.

A first step is to use the video image obtained in the step 1 to expand the image to a certain extent by means of rotation, translation, etc. A second step is to obtain four vertex coordinates and corresponding images of a vertical minimum bounding rectangle of each ship target in a remote sensing image, and output the image and all target coordinates thereon together as the positive sample. In this step, the coordinates of the four vertices correspond to the image area of the target ship. A third step is to randomly intercept other regions around the positive sample to obtain four vertex coordinates of a vertical minimum bounding rectangle thereof as negative sample coordinates, and output the image and the negative sample coordinates thereon together.

In step 3, training is performed by a region-based convolutional neural network: the samples of the ship target in the video are inputted into a neural network to train a model by a region-based convolutional neural network method, wherein a theoretical process thereof is as follows.

Standard formatting is carried out on data of the positive and negative samples of the ship target completed in the step 1 to convert the data into a structured database format and input the data into a convolutional neural network for training to obtain a training result model of the ship target under the surveillance video. The region-based convolutional neural network is composed of multiple alternating convolutional layers, pooling layers and fully connected layers, and mainly employs a back propagation algorithm (BP algorithm), wherein one input layer, multiple hidden layers and one output layer are provided. A calculation relation between the two layers in the BP algorithm is expressed by a formula as follows:

$$X_j^l = f\left(\sum_i X_i^{l-1} \omega_{ij}^l + b_j^l\right)$$

wherein, i is an index value of an input layer unit, j is an index value of a hidden layer unit, $\omega_{ij}^l$ represents a weight between the input layer and the hidden layer, $b_j^l$ represents an activation bias between each layer, and f( ) represents an activation function of the output layer.

The convolutional layer in the convolutional neural network is updated by the network using a BP neural network mode. In one convolutional layer, a feature map of a previous layer is convolved by a learnable convolution kernel, and then an output feature map can be obtained by an activation function. A lower layer update algorithm after adding convolution operation is as follows:

$$X_j^l = f\left(\sum_{i \in M_j} X_i^{l-1} \otimes k_{ij}^l + b_j^l\right)$$

wherein, $M_j$ represents all selection sets of the input layer. $k_{ij}^l$ represents the convolution kernel between the input layer and the hidden layer, and "⊗" represents a convolution operation process. Therefore, the formula reflects an operational relation between an $l^{th}$ layer and an $l-1^{th}$ layer.

In addition to the convolution layer, the convolutional neural network also has an important operation process, i.e., a pooling process and computation of the pooling layer. The pooling process is a process of aggregating and counting features of different positions in a large image, which greatly decreases feature redundancy and reduces feature dimensions to be counted. A calculation formula of the pooling layer is:

$$X_j^l = f(B_j^l D(X_j^{l-1}) + b_j^l)$$

wherein, D( ) represents a downsampling function of the pooling process, while $B_j^l$ and $b_j^l$ are to set different activation biases, and each bias corresponds to each output layer.

Figure 3:
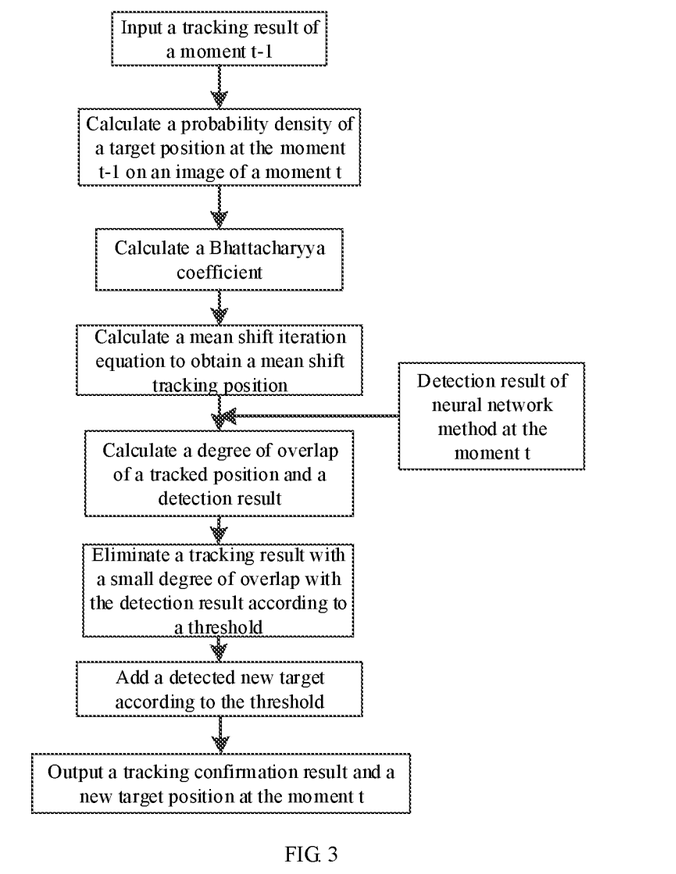
FIG. 3 is a flow chart of a specific strategy for obtaining a tracking result based on depth learning network and mean shift tracking methods after step 3 in the embodiment of the disclosure.

In step 4, initial frame data of the video is extracted, and a detection result and a probability density at an initial moment are calculated: the video data is inputted, and ship detection and probability density calculation are performed on the initial moment data.

a. Ship detection is performed on the initial moment in the video data by using the model trained in the step 2 to obtain a ship detection position at the initial moment as an initial position for tracking, and each ship target is numbered.

b. A probability density of each ship at the initial moment $t_0$ is calculated on the basis of the mean shift tracking method, and used as a first input result of FIG. 3. Assuming that the target contains n pixels, then $\{z_i\}_{i=1 \ldots n}$ represents a position of each pixel, and a gray color space of the target region is divided to obtain a gray histogram composed of m (m=16 in the embodiments of this patent) equal intervals. That is, in the histogram of gray scales in each interval, it can be seen that gray scales are distributed in each interval. A formula for calculating an initial value $q_r^{t_0}$ of the probability density of the ship is as follows:

$$q_r^{t0} = C \sum_{i=1}^{n} K(\|z_i^*\|^2) \delta[b(z_i) - r]$$

$$C = 1 \bigg/ \sum_{i=1}^{n} K(\|z_i^*\|^2)$$

$$z_i^* = \left(\frac{(x_i - x_0)^2 + (y_i - y_0)^2}{x_0^2 + y_0^2}\right)^{1/2}$$

wherein, $z_i^*$ represents that a center point $(x_0, y_0)$ of the ship is set as a normalized pixel position of an origin, $x_i$ represents an x-coordinate of the pixel at position $z_i$, and $y_i$ represents a y-coordinate of the pixel at position $z_i$. An Epanechikov kernel function is selected for K, C represents a normalized coefficient, $b(z_i)$ represents a histogram interval in which the pixel at the position $z_i$ is located, $r = \{1, \ldots, m\}$ is a color interval unit index of the histogram, and a function $\delta[b(z_i) - r]$ determines whether the gray value of the pixel at the position z in the target region belongs to the $r^{th}$ histogram interval unit in the histogram, wherein the gray value is 1 when it belongs to the histogram interval unit in the histogram, otherwise it is 0.

In step 5, data of a subsequent frame to be processed is extracted, and a ship tracking result of a current frame is determined by a recursive method: a previous moment is set as a moment t−1 and a current moment is set as a moment t, then a ship tracking result of the moment t is determined by a calculation result of the moment t−1, and the ship position and evaluation may be recorded and stored. A procedure thereof is shown in FIG. 3, and a detailed process is as follows.

A. Inputting the tracking result of the moment t−1, and calculating the probability density of the target position at the moment t−1 on the image of the moment t: taking ξ ship positions tracked at the moment t−1 as initial positions, respectively taking a center coordinate $f_0$ of each ship position as an initial target position of the ship tracked at the moment t, taking the $f_0$ as a center of a search window to obtain a center position coordinate f of a corresponding candidate ship, calculating a region histogram of a candidate position using the calculation formula in the b of the step 4, and further calculating a probability density of the candidate position, which is as follows:

$$q_r^t(f) = C \sum_{i=1}^{n} \left( \left\| \frac{f-z_i}{d} \right\|^2 \right) \delta[b(z_i) - r]$$

wherein, d is a window size of a kernel function (in the embodiment, d=16 is set for a ship width size in the ship data.

B. Calculating a Bhattacharyya coefficient, and calculate a mean shift iteration equation to obtain a mean shift tracking position: describing a degree of similarity between a probability density of the ship position tracked at the moment t−1 and a probability density of a candidate ship position by a Bhattacharyya coefficient, and calculating a mean shift iteration equation in a center of the region according to a Taylor expansion formula as follows:

$$f_{k+1} = f_k + \frac{\sum_{i=1}^{n} w_i(f_k - z_i)(-K'(x))\left(\left\|\frac{f-z_i}{d}\right\|^2\right)}{\sum_{i=1}^{n} w_i(-K'(x))\left(\left\|\frac{f-z_i}{d}\right\|^2\right)}$$

$$w_i = \sum_{r=1}^{m} \sqrt{\frac{q_r^{t_0}}{q_r^t(f)}} \delta[b(z_i) - r]$$

wherein, K'(x) is inverse of the function K obtained when an x-coordinate of the input position is x, and $w_i$ is an intermediate process of calculation.

Figure 4:
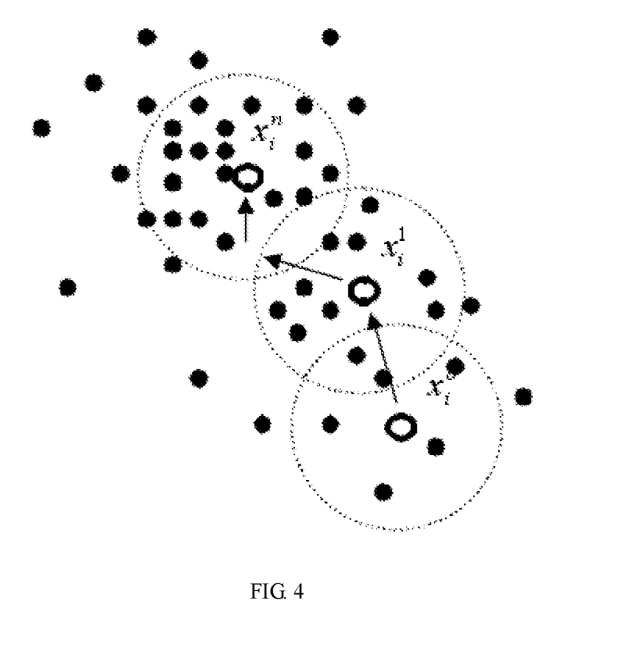
FIG. 4 is a schematic diagram of an iterative process of a mean shift algorithm used in step 4 and step 5 in the embodiment of the disclosure.

As shown in the above formula, the entire mean shift tracking method is a process of iteratively obtaining $f_{k+1}$ (a center position of an $k+1^{th}$ iteration) from $f_k$ (a center position of a $k^{th}$ iteration), so that the model moves continuously towards a direction with a maximum color change until the last two moving distances are less than a threshold (a threshold of $10^{-6}$ is adopted in this patent), i.e., finding a ship position $Boxm^t$ obtained by a mean shift result at the moment t. A schematic diagram of the entire mean shift process is as shown in FIG. 4. With the iteration process, an initial value of a center position $x_i^0$ of the target in the figure gradually moves towards a clustering center, moves to a position $x_i^1$ after a first iteration, and moves to a position $x_i^n$ after an $n^{th}$ iteration. For the multiple ship positions ($\xi$) tracked at the moment t−1, the corresponding ship positions $Boxm^t$ are finally obtained respectively by the mean shift tracking method. id={1, . . . , $\xi$} represents numbers of multiple mean shift results at the moment t, and the $id^{th}$ ship position is represented as $Boxm_{id}^t$.

C. Extracting a detection result of the neural network method at the moment t, calculating a degree of overlap of a tracked position and the detection result, that is, the detection result is determined as the position of the ship, and the tracking result is used for data association. And excluding a tracking result with a small overlap with the detection result according to the threshold: performing ship detection on an image (inputting the image in the neural network based on convolution) at the moment t by the region-based convolutional neural network method and the previously trained ship model, wherein the method independently obtains the detection result of the image at the moment t, namely µ candidate ship positions $Boxd^t$ obtained by detection. num is set as the detection result number at the moment t, and the num={1, . . . , µ}$^{th}$ detection coordinate is $Boxd_{num}^t$. A degree of overlap between the $Boxd_{num}^t$ and the $id^{th}$ $Boxm_{id}^t$ is calculated, and a calculation formula of the degree of overlap is as follows:

$$O = \frac{S(Boxm_{id}^t \cap Boxd_{num}^t)}{S(Boxm_{id}^t \cup Boxd_{num}^t)}$$

wherein, S represents an area size, and a result of dividing an area of an intersection region of the and the by an area of an union region of the two is obtained by formula. Meanwhile, a value of degree of overlap $O_{max}$ between each $Boxm_{id}^t$ and the corresponding $Boxd_{num}^t$ with a maximum degree of overlap is recorded.

In other words, there are $\xi$ ships at the moment t−1, and id mean shift results will be obtained during the mean shift algorithm, wherein, id=1, . . . , $\xi$; µ detection results will be obtained during detection, wherein num=1, . . . , µ. For each detection result, obtain the overlap O value with the mean shift result, when the overlap value O between the detection result and any mean shift result is less than the threshold $\theta_1$, the mean shift result is considered to be a false alarm, and when the overlap O value is greater than the threshold $\theta_1$, the detection result is considered to be the coordinates of the target ship, and the corresponding mean shift result is retained.

D. Adding the detected new target according to the threshold, and outputting a tracking confirmation result and a new target position at the moment t: updating the new ship target appeared at the moment t by the neural network detection result in the step C. For each $Boxd_{num}^t$, a maximum value of the degree of overlap obtained respectively between each $Boxm_{id}^t$ and all the $Boxm_{id}^t$ reserved in the step C is calculated and recorded as $O_{max}'$ wherein the calculation method of the degree of overlap is consistent with that in the step C. If $O_{max}' < \theta_2$ ($\theta_2=0.4$ in the embodiment), the ship target is considered as an emerging ship at the moment t, and is added to a tracking result at the moment t to obtain a complete tracking result set. That is, for the detection result of each $Boxd_{num}^t$, it is calculated whether all the reserved $Boxm_{id}^t$ overlap with the $Boxd_{num}^t$. If none of the $Boxm_{id}^t$ overlap with the $Boxd_{num}^t$, then the ship target is the newly emerged ship target. In this embodiment, when the overlap O value is less than 0.4, it is determined as a newly appearing ship, and the detection result is output as the new target result tracked. When the overlap O value is greater than 0.8, it is determined as the target ship, and the detection result is output as the new frame position result of the tracked existing target. When there is a false alarm between 0.4 and 0.8, and the detection result of the neural network is reserved as the target ship area, and continue to calculate the overlap O value with the next mean shift result, if the overlap between the detection result and other mean shift result is less than 0.4, the detection result will be regarded as a new ship, and if the overlap between the detection result and other mean shift result is greater than 0.8, the detection result is determined as the target ship.

So far, the detailed implementation process of the ship automatic ship tracking method based on deep learning network and mean shift used in the patent has been completely introduced. In specific implementation, the flow provided by the technical solutions of the disclosure can be automatically operated by those skilled in the art by adopting a computer software technology, and a corresponding system can also be realized by adopting a modularization mode. The embodiments of the disclosure further provide an automatic ship tracking system based on deep learning network and mean shift, including the following modules:

a first module configured to collect surveillance video data which includes collecting coastal region surveillance video data under visible light and extracting each frame of image;

a second module configured to perform preprocessing based on a video image obtained by the first module to extract a positive sample and a negative sample of a ship target;

a third module configured to input the samples of the ship target in the video into a neural network to train a model by a region-based convolutional neural network method;

a fourth module configured to extract initial frame data of the video and perform ship detection and probability density calculation on initial moment data according to the trained model obtained by the third module; and a fifth module configured to determine a ship tracking result at the current moment by a calculation result of a previous moment, which includes the following ways:

taking $\xi$ ship positions tracked at a moment t−1 as initial positions, respectively taking a center coordinate $f_0$ of each ship position as an initial target position of the ship tracked at a moment t, taking the $f_0$ as a center of a search window to obtain a center position coordinate f of a corresponding candidate ship, calculating a region histogram of a candidate position, and further calculating the probability density;

describing a degree of similarity between the ship model and the candidate ship by a Bhattacharyya coefficient, calculating a mean shift iteration equation in a center of the region, so that the model moves continuously towards a direction with a maximum color change until the last two moving distances are less than a corresponding preset threshold, finding a ship position obtained by a mean shift result at the moment t, setting that multiple ship positions $Boxm^t$ are obtained, and expressing an $id^{th}$ ship position as $Boxm_{id}^t$;

performing ship detection on an image at the moment t by the region-based convolutional neural network method, setting that a $num^{th}$ detection coordinate of multiple ships in the image at the moment t is $Boxd_{num}^t$, calculating a degree of overlap between the $Boxd_{num}^t$ and the $id^{th}$ ship position $Boxm_{id}^t$, recording a value of degree of overlap $O_{max}$ between each $Boxm_{id}^t$ and the corresponding $Boxd_{num}^t$ with a maximum degree of overlap; and updating a new ship target appeared at the moment t by a neural network detection result of the step C, which includes calculating a maximum value of the degrees of overlap obtained respectively between each $Boxd_{num}^t$ and all the $Boxm_{id}^t$, if the $O_{max}^t$ is less than a corresponding threshold $\theta_2$, considering the ship target as the ship appeared at the moment t, and adding the ship target into a tracking result of the moment t to obtain a complete tracking result set.

The specific implementation of each module can be seen in the corresponding steps, and will not be described in detail in the disclosure.

The specific examples described herein are merely illustrative of the spirit of the disclosure. Those skilled in the art to which the disclosure belongs can make various modifications or supplements to the specific examples described or replace the specific examples in a similar way without departing from the spirit of the disclosure or exceeding the scope defined in the appended claims.

Each of devices according to the embodiments of the present invention may be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the present invention. The present invention may further be implemented as device program (for example, computer program and computer program product) for executing some or all of the methods as described herein. Such program for implementing the present invention may be stored in the computer readable medium, or have a form of one or more signals. Such a signal may be downloaded from the internet websites, or be provided in carrier, or be provided in other manners.

Figure 5:
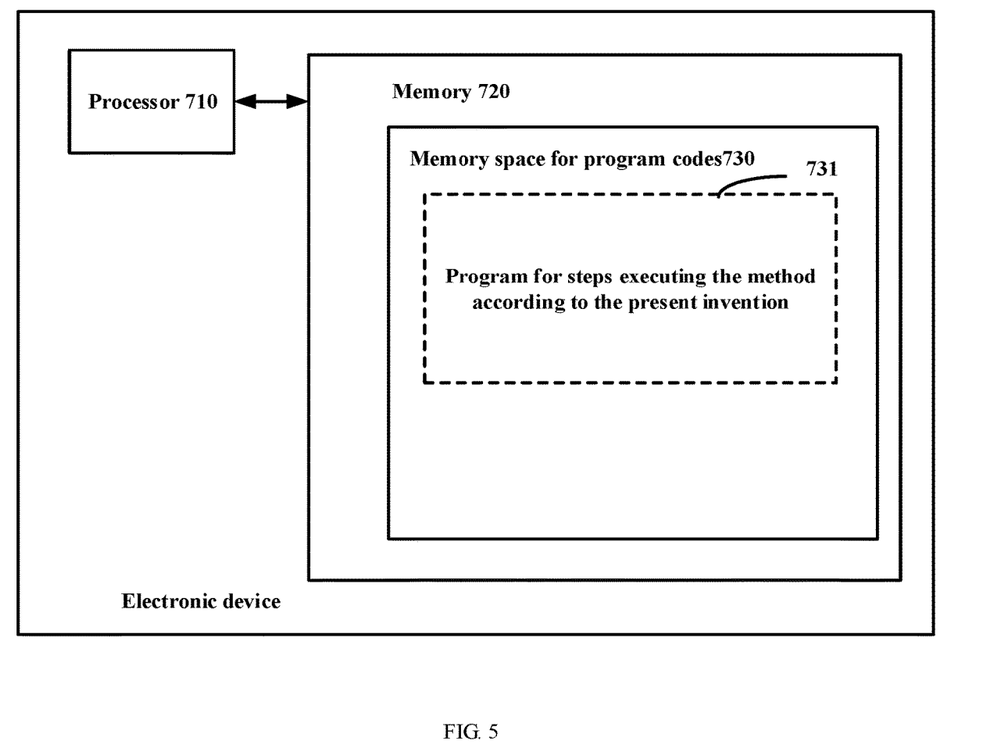
FIG. 5 schematically shows a block diagram of an electronic device used to execute a method according to the present invention.
Figure 6:
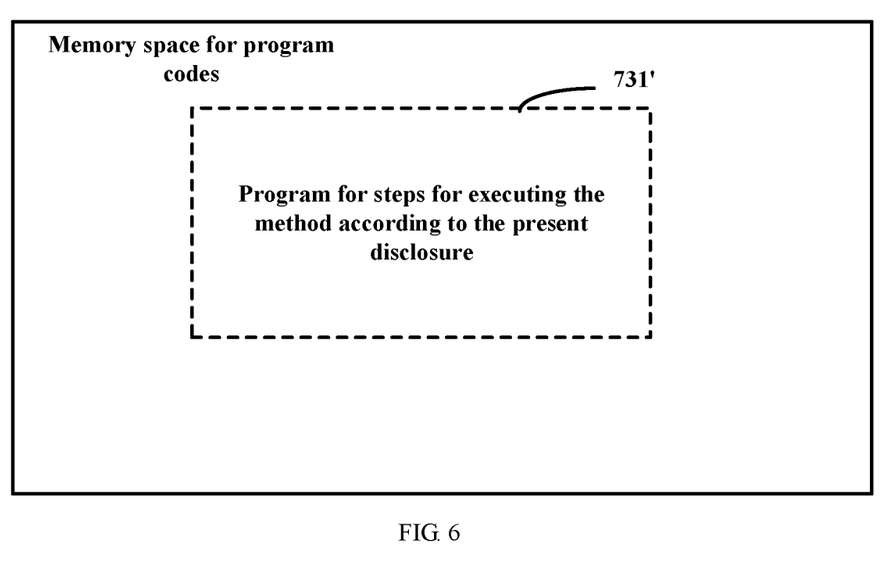
FIG. 6 schematically shows a memory cell used to save or carry program code for realizing the method, according to the present invention.

For example, FIG. 5 is a block diagram of a electronic device for executing the method according to the present invention. Traditionally, the electronic device includes a processor 710 and a computer program product or a computer readable medium in form of a memory 720. The memory 720 could be electronic memories such as flash memory, EEPROM (Electrically Erasable Programmable Read-Only Memory), EPROM, hard disk or ROM. The memory 720 has a memory space 730 for program codes 731 executing any steps in the above methods. For example, the memory space 730 for program codes may include respective program codes 731 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in FIG. 6. The memory cells may be provided with memory sections, memory spaces, etc., similar to the memory 720 of the electronic device as shown in FIG. 5. The program codes may be compressed, for example, in an appropriate form. Usually, the memory cell includes computer readable codes 731' which may be read, for example, by processors 710. When these codes are operated on the electronic device, the electronic device may execute respective steps in the method as described above.

The "an embodiment", "embodiments" or "one or more embodiments" mentioned in the disclosure means that the specific features, structures or performances described in combination with the embodiment(s) would be included in at least one embodiment of the present invention. Moreover, it should be noted that, the wording "in an embodiment" herein may not necessarily refer to the same embodiment.

Many details are discussed in the specification provided herein. However, it should be understood that the embodiments of the disclosure may be implemented without these specific details. In some examples, the well-known methods, structures and technologies are not shown in detail so as to avoid an unclear understanding of the description.

It should be noted that the above-described embodiments are intended to illustrate but not to limit the present invention, and alternative embodiments may be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings may be interpreted as a name.

Also, it should be noticed that the language used in the present specification is chosen for the purpose of readability and teaching, rather than explaining or defining the subject matter of the present invention. Therefore, it is obvious for an ordinary skilled person in the art that modifications and variations could be made without departing from the scope and spirit of the claims as appended. For the scope of the present invention, the publication of the inventive disclosure is illustrative rather than restrictive, and the scope of the present invention is defined by the appended claims.

What is claimed is:

1. An automatic ship tracking method based on a deep learning network and a mean shift, comprising the following steps:

step 1: collecting surveillance video data, wherein the surveillance video data comprises coastal region surveillance video data under visible light; and extracting a video image from the surveillance video data;

step 2: performing a preprocessing based on the video image obtained in the step 1 to extract a positive sample and a negative sample of a first ship target;

step 3: inputting the positive sample and the negative sample of the first ship target in the video image into a neural network to train a model by a region-based convolutional neural network method;

step 4: extracting initial frame data of the video image, and performing a ship detection and a probability density calculation on the initial frame data according to the model obtained in the step 3, wherein the probability density calculation is realized by dividing a gray color space of a target region to obtain a gray histogram formed by multiple equal histogram intervals, and calculating the probability density according to one histogram interval of the multiple equal histogram intervals, a gray value of a pixel in the target region belongs to the one histogram interval; and step 5: determining a ship tracking result at a current moment by a calculation result of a previous moment, wherein the step 5 further comprises the following processing:

step A: taking $\xi$ ship positions tracked at a moment t−1 as initial positions, respectively taking a center coordinate $f_0$ of each of the $\xi$ ship positions as an initial target position of a ship tracked at a moment t, taking the $f_0$ as a center of a search window to obtain a center position coordinate f of a corresponding candidate ship, calculating a region histogram of a candidate position, and further realizing the probability density calculation;

step B: describing a degree of similarity between a ship model and the corresponding candidate ship by a Bhattacharyya coefficient, calculating a mean shift iteration equation in a center of the target region, so that the ship model moves continuously towards a direction with a maximum color change until last two moving distances are less than a corresponding preset threshold, finding a ship position obtained by a mean shift result at the moment t, setting that multiple ship positions $Boxm^t$ are obtained, and expressing an $id^{th}$ ship position as $Boxm_{id}^t$;

step C: by the region-based convolutional neural network method, performing the ship detection on the video image at the moment t, and obtaining the $num^{th}$ detection coordinate $Boxd_{num}^t$ of multiple ships in the video image at the moment t, calculating a degree of overlap between the $Boxd_{num}^t$ and the $Boxm_{id}^t$, recording a value of degree of overlap $O_{max}$ between each $Boxm_{id}^t$ and the corresponding $Boxd_{num}^t$ with a maximum degree of overlap, and if the $O_{max}$ is less than a corresponding threshold $\theta_1$, considering the ship position as false-alarm and deleting the $Boxm_{id}^t$; and step D: updating a second ship target appeared at the moment t by a neural network detection result of the step C, wherein the step D further comprises calculating a maximum value of the degrees of overlap obtained respectively between each $Boxd_{num}^t$ and all the $Boxm_{id}^t$, if the $O_{max}{}'$ is less than a corresponding threshold $\theta_2$, considering the second ship target as the ship appeared at the moment t, and adding the second ship target into a tracking result of the moment t to obtain a complete tracking result set.

2. The automatic ship tracking method based on the deep learning network and the mean shift according to claim 1, wherein a calculation formula of the degree of overlap is as follows:

$$O = \frac{S(Boxm_{id}^t \cap Boxd_{num}^t)}{S(Boxm_{id}^t \cup Boxd_{num}^t)}$$

wherein, S represents an area size.

3. An automatic ship tracking system based on a deep learning network and a mean shift, comprising:

a first module, wherein the first module is configured to collect surveillance video data and extract a video image from the surveillance video data, and the surveillance video data comprises coastal region surveillance video data under visible light;

a second module configured to perform preprocessing based on the video image obtained by the first module to extract a positive sample and a negative sample of a first ship target;

a third module configured to input the positive sample and the negative sample of the first ship target in the video image into a neural network to train a model by a region-based convolutional neural network method;

a fourth module configured to extract initial frame data of the video image and perform a ship detection and a probability density calculation on the initial frame data according to the model obtained by the third module, wherein the probability density calculation is realized by dividing a gray color space of a target region to obtain a gray histogram formed by multiple equal histogram intervals, and calculating the probability density according to one histogram interval of the multiple equal histogram intervals, a gray value of a pixel in the target region belongs to the one histogram interval; and a fifth module configured to determine a ship tracking result at a current moment by a calculation result of a previous moment, comprising the following steps:

taking $\xi$ ship positions tracked at a moment t−1 as initial positions, respectively taking a center coordinate $f_0$ of each of the $\xi$ ship positions as an initial target position of a ship tracked at a moment t, taking the $f_0$ as a center of a search window to obtain a center position coordinate f of a corresponding candidate ship, calculating a region histogram of a candidate position, and further realizing the probability density calculation;

describing a degree of similarity between a ship model and the corresponding candidate ship by a Bhattacharyya coefficient, calculating a mean shift iteration equation in a center of the target region, so that the ship model moves continuously towards a direction with a maximum color change until last two moving distances are less than a corresponding preset threshold, finding a ship position obtained by a mean shift result at the moment t, setting that multiple ship positions $Boxm^t$ are obtained, and expressing an $id^{th}$ ship position as $Boxm_{id}^t$;

performing the ship detection on the video image at the moment t by the region-based convolutional neural network method, setting that a $num^{th}$ detection coordinate of multiple ships in the video image at the moment t is $Boxd_{num}^t$, by the region-based convolutional neural network method, performing the ship detection on the video image at the moment t, and obtaining the $num^{th}$ detection coordinate $Boxd_{num}^t$ of multiple ships in the video image at the moment t, calculating a degree of overlap between the $Boxd_{num}^t$ and the $Boxm_{id}^t$, recording a value of degree of overlap $O_{max}$ between each $Boxm_{id}^t$ and the corresponding $Boxd_{num}^t$ with a maximum degree of overlap, and if the $O_{max}$ is less than a corresponding threshold $\theta_1$, considering the ship position as false-alarm and deleting the $Boxm_{id}^t$; and updating a second ship target appeared at the moment t by a neural network detection result, wherein the updating further comprises calculating a maximum value of the degrees of overlap obtained respectively between each $Boxd_{num}^t$ and all the $Boxm_{id}^t$, if the $O_{max}'$ is less than a corresponding threshold $\theta_2$, considering the second ship target as the ship appeared at the moment t, and adding the second ship target into a tracking result of the moment t to obtain a complete tracking result set.

4. The automatic ship tracking system based on deep learning network and mean shift according to claim 3, wherein a calculation formula of the degree of overlap is as follows:

$$O = \frac{S(Boxm_{id}^t \cap Boxd_{num}^t)}{S(Boxm_{id}^t \cup Boxd_{num}^t)}$$

wherein, S represents an area size.

* * * * *